UNITED STATES PATENT OFFICE.

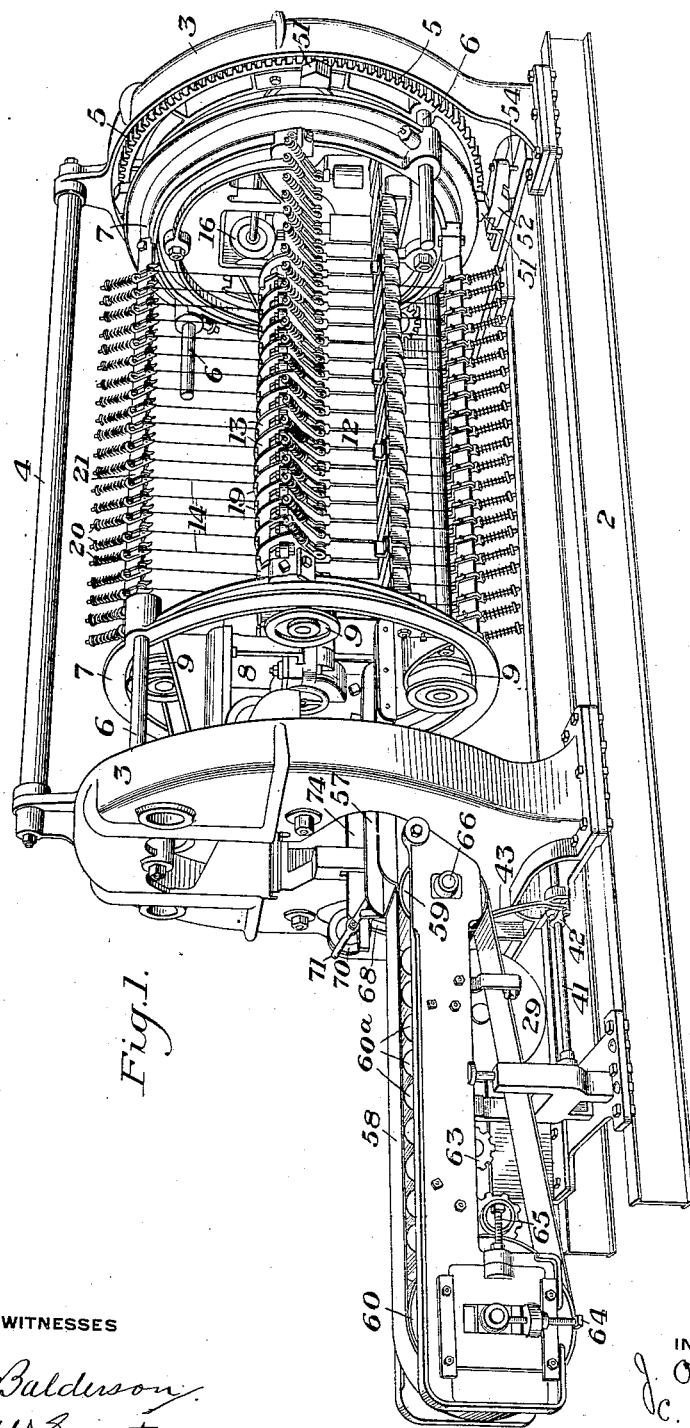

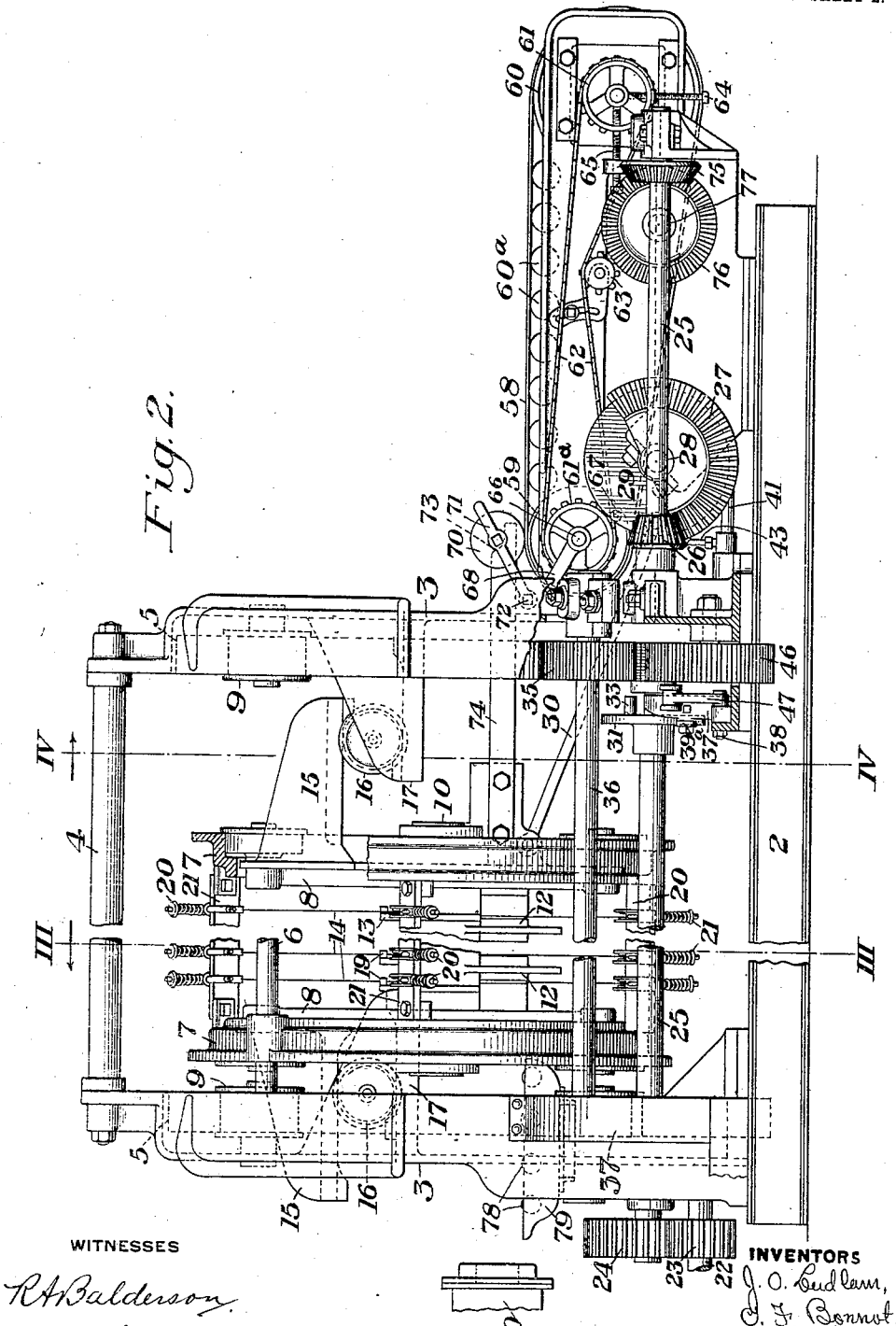

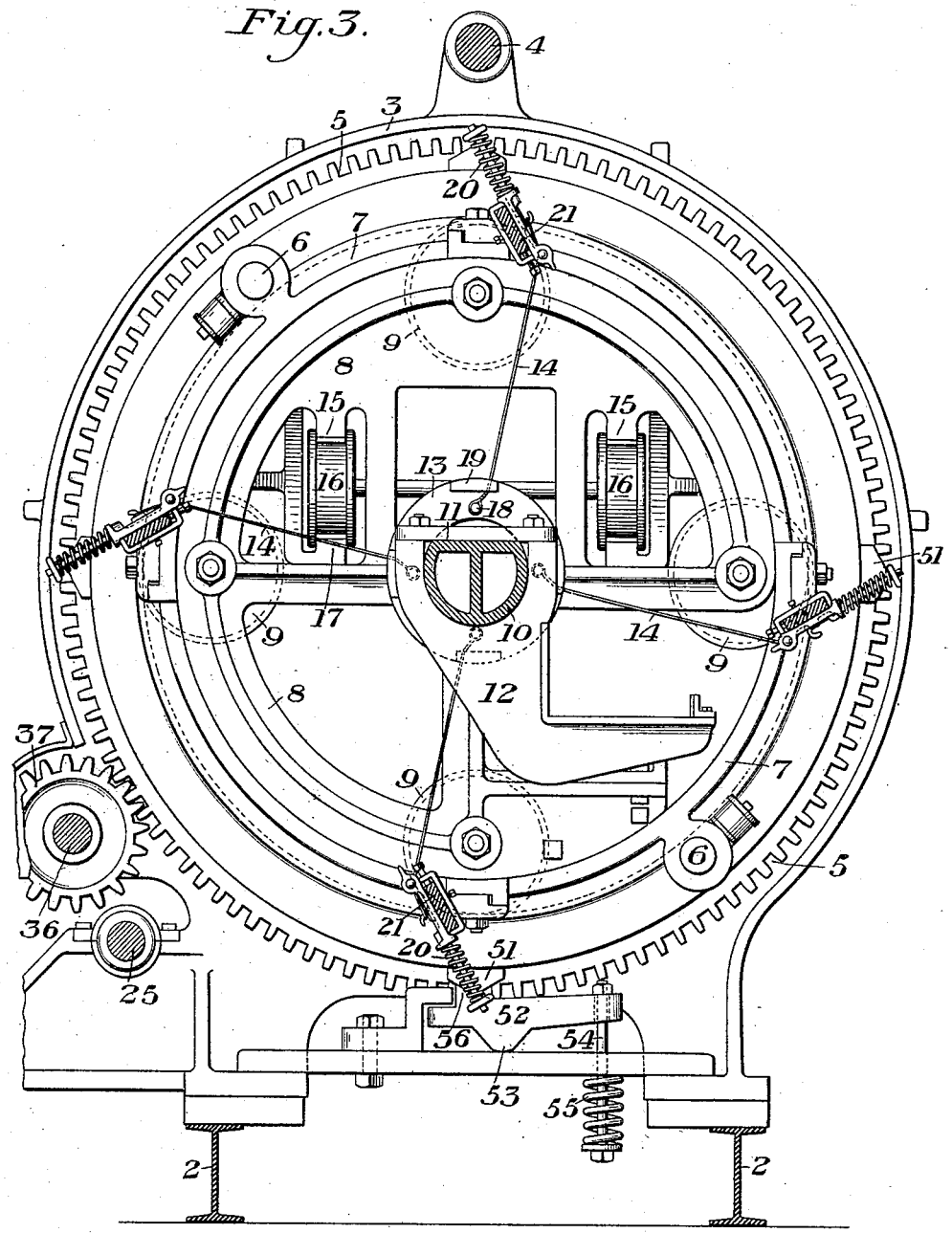

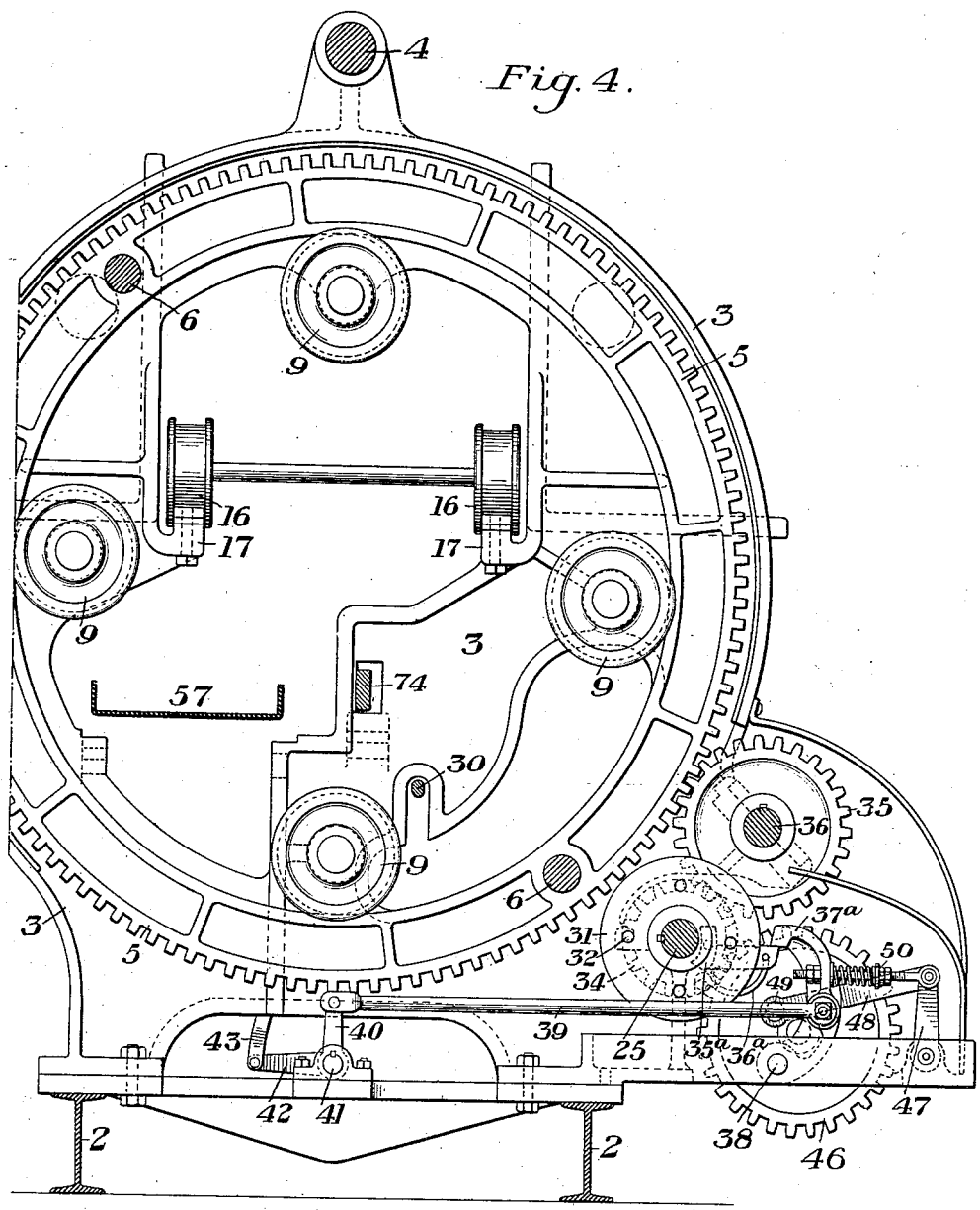

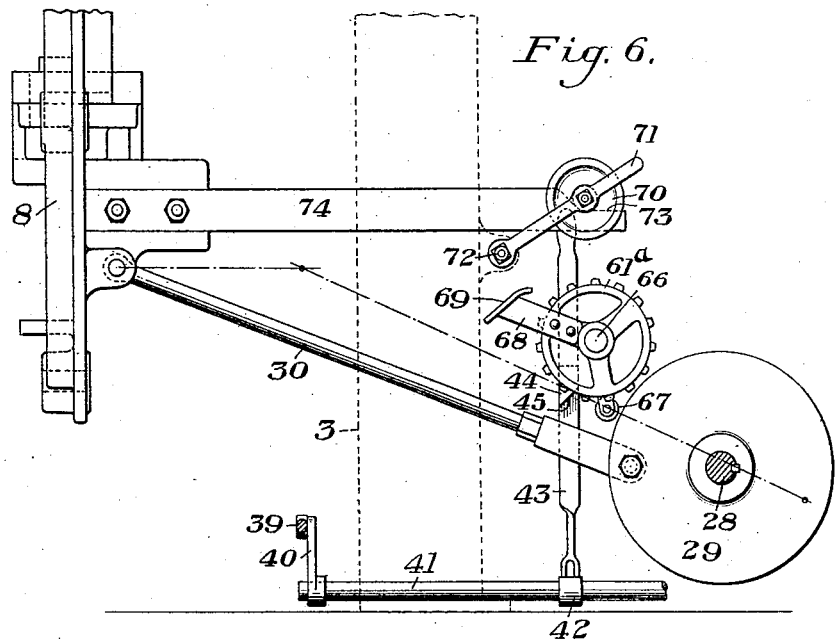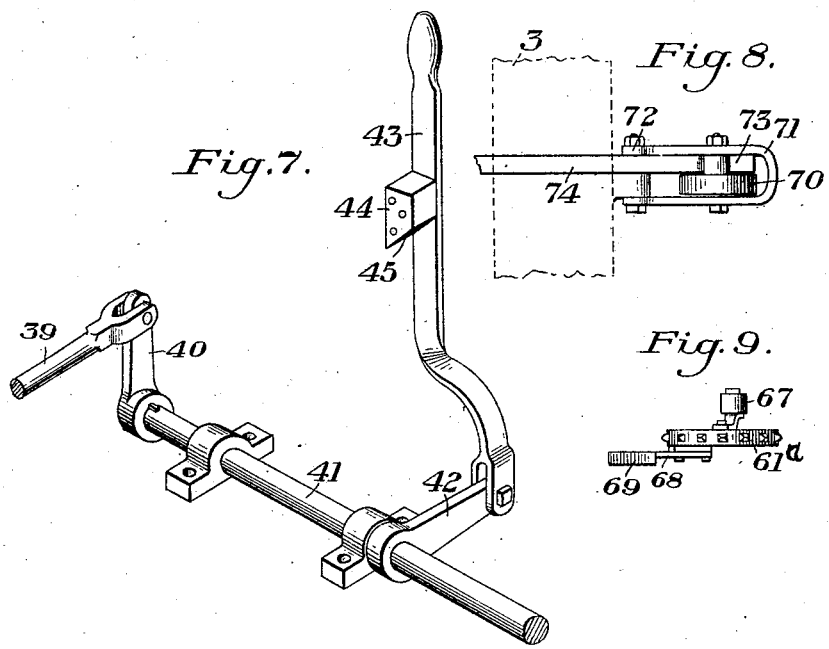

JOHN O. LUDLAM AND CHARLES F. BONNOT, OF CANTON, OHIO, ASSIGNORS TO THE BONNOT COMPANY, OF CANTON, OHIO, A CORPORATION OF OHIO.

BRICK-CUTTING MACHINE.

No. 917,630.  Specification of Letters Patent.  Patented April 6, 1909.

Application filed December 23, 1907. Serial No. 407,640.

*To all whom it may concern:*

Be it known that we, JOHN O. LUDLAM and CHARLES F. BONNOT, both of Canton, Stark county, Ohio, have invented a new and useful Brick-Cutting Machine, of which the following is a full, clear, and exact description, reference being had to the accompanying drawings, forming part of this specification, in which—

Figure 1 is a perspective view of a brick-cutting machine embodying our invention; Fig. 2 is a side elevation of the same with the central part of the machine broken away; Fig. 3 is a section on the line III—III of Fig. 2; Fig. 4 is a section on the line IV—IV of Fig. 2, looking in the opposite direction from Fig. 3; Fig. 5 is a detail view of the clutch mechanism; and Figs. 6, 7, 8 and 9 are detail views of certain of the parts hereinafter referred to.

Our invention has relation to the class of brick-cutting machines, and is designed to provide a machine of this character in which the parts which require to be moved to effect the cutting operation are restricted to the cutting frame and to the cutting elements carried thereby; which can be readily adjusted to cut bricks of different thicknesses; and in which the tracks upon which the cutting frame travel are above the plane of movement of the column of clay, whereby they can be more easily kept free from dirt, etc.

A further object of the invention is to provide a machine of this character which can be set very closely to the delivery die of the mixer, thereby avoiding a long intermediate clay column, and whose operation is controlled by the movement of the column of clay.

Numerous other objects and advantages of our invention will hereinafter appear.

The precise nature of our invention will be best understood by reference to the accompanying drawings, in which we have shown one embodiment of our invention, and which will now be described, it being premised, however, that various changes may be made therein by those skilled in the art without departing from the spirit and scope of the invention as defined in the appended claims.

In the drawings, the numeral 2 designates the bed of the machine, to which are rigidly secured the two end plates or heads 3. These end plates or heads are shown as being further rigidly connected by a tie rod 4. Rotatably mounted in each head is an annular gear 5, which is arranged to be intermittently rotated by means of gearing hereinafter described. Secured to each of these gears at diametrically opposite points are the guide rods or mandrels 6, which are slidingly engaged by the ring plates 7. By means of these guide rods or mandrels, the ring plates are capable of a longitudinal movement between the two gears 5, while at the same time they are caused to rotate with said gears in their different positions. Within each of these ring plates is a non-rotatable frame 8, in which are journaled a series of wheels or rollers 9, upon which the ring plates 7 are arranged to rotate. Secured at its end portions in these two frames 8 is a central non-rotatable shaft 10, which preferably has its upper side flattened as best shown at 11 in Fig. 3. Clamped to this shaft are a series of depending angles or brackets 12, whose horizontal arms form a table or support which extends substantially the entire distance between the two ring plates. These brackets or angles are shown as slightly spaced from each other by means of the spacing plates or disks 13, which are rotatably mounted on the shaft 10, the interval between adjacent brackets being just sufficient to permit the entrance of the cutting wires 14. Secured to the frames 8 and projecting outwardly from each of them is an arm 15, which is supported on a roller 16, journaled in a bracket or extension 17 of the stationary end frame 3. The arrangement of these parts is most clearly shown in Fig. 2. These rollers 16 carry the entire weight of the cutting frame composed of the ring plates and their connections.

The cutting wires 14 are arranged in four equi-distant series, being connected at their inner ends to the spacing disks or plates 13 at the points 18, from whence they pass outwardly in a substantially radial direction through the guide lugs 19 secured to said disks or plates, and are connected at their outer ends to tension devices 20 which are mounted on bars 21 which connect the ring plates 7. These tension devices may be of any well-known or suitable character, and form no part of our present invention.

22 designates the driving shaft of the machine, which has a spur gear 23 meshing with a spur gear 24 on a longitudinal shaft 25. Rigidly secured to the shaft 25 is a bevel pinion 26, which is arranged to engage a mutilated or half gear 27 rigidly secured to a transverse shaft 28 at the delivery end of the machine. Keyed or otherwise fixed to the shaft 28 is a crank disk 29, to which is connected one end of a pitman 30. The other end of this pitman is connected to one of the frames 8 of the cutting frame. Also rigidly secured to the shaft 25 is a disk 31, (shown in detail in Fig. 5), having a series of projecting pins 32, preferably provided with anti-friction rollers 33. Loosely mounted on the shaft 25 adjacent to this disk 31 is a spur gear 34, whose teeth mesh with a spur gear 35 on a shaft 36, which extends parallel to the shaft 25, and which carries at its opposite end another spur gear 37. The two spur gears 37 and 36 engage the annular gears 5 at the respective ends of the machine. The driving connection between the clutch disk 31 and spur wheel 34 forms no part of the present invention, but is of the following character: For a more complete description reference may be had to Patent No. 577,870, dated March 2, 1897.

Pivoted to the spur gear 34 is a dog 35$^a$, which is normally held in the position shown in Fig. 4 by a spring 36$^a$. In this position the dog will not be engaged by the pins and rollers 32 and 33 on the clutch disk, and the pinion 34 will remain stationary, the dog 35$^a$ being maintained in inoperative position by its engagement with the dog 37$^a$. This dog 37$^a$ is pivoted to the frame at 38 (see Fig. 4), and its intermediate portion is connected by a link arm 39 to an arm 40 on a rocker shaft 41 (see Fig. 7), which is journaled at the base of the machine. Said shaft has an arm 42, to which is pivoted the lower end of an upwardly extending bar or arm 43 having thereon a lug or projection 44 with a cam surface 45 at its under side. When this arm 43 is actuated in the manner hereinafter described, the shaft 41 is rocked in its bearings, thereby pushing on the link rod 39 to move the dog 37$^a$ out of holding engagement with the dog 35$^a$. The spring 36$^a$ now acts to throw said dog into position to form a driving engagement with the pins 32 and the rollers 33 of the clutch disk 31. The gear wheel 34 then revolves, and through the gearing described turns the annular gears 5. This operation will be further hereinafter described.

For the purpose of moving the dog 37$^a$ into position to again engage the dog 35$^a$ and throw it out of driving engagement with the clutch disk 31, the following mechanism is provided:—46 designates a spur gear wheel, whose teeth are in mesh with the spur gear 34, and which is driven thereby. 47 is a rocker arm, which is pivoted to the frame 2, and whose upper end is connected by link 48 with a crank pin 49 on the wheel 46. 50 is an adjustable connection between the rocker arm 47 and the dog 37$^a$. When the spur gear wheel 34 has made a sufficient number of revolutions to impart a one-quarter revolution to the annular gears 5, the spur gear wheel 46 will have been turned sufficiently to pull the dog 37$^a$ back into engaging relation to the dog 35$^a$ and prevent further rotation of the spur wheel 34. For the purpose of checking the rotation of the annular gears 5, and preventing them from being carried beyond their proper movement by momentum, one of the gears is provided with a number of stop lugs or teeth 51 which are arranged to engage the braking dog 52. This dog is rested on the base portion of the frame 2 upon a fulcrum projection 53 (see Fig. 3). The dog is engaged by a bolt 54 having a spring 55 seated between its headed lower end and the under side of the machine. The stop lugs 51 are so positioned that after each quarter revolution of the annular gears one of these lugs will come into engagement with the beveled nose 56 of the braking dog, and the gear will be held by the friction of such engagement from further movement. When the gear 34 is again driven, the stop 51 will ride over the nose of the braking dog 52 to permit the next quarter revolution of the annular gear.

57 designates a trough or brick at the delivery end of the machine through which the cut bricks are moved and delivered onto an endless conveyer belt 58. This belt, which is preferably of canvas, or some other material having a frictional surface, is carried on the two drums 59 and 60, and the intermediate supporting rollers 60$^a$. On the shaft of each of these drums is a sprocket wheel 61$^a$, and passing around these sprocket wheels is a driving chain 62, having an adjustable idler or slack take-up 63. The drum 60 constitutes a measuring or timing drum, and is made adjustable in its bearings both vertically and horizontally by means of the adjusting screws 64 and 65. The conveyer and measuring belt 58 is driven by the friction of the column of cut brick thereon, and in turn revolves the measuring drum 60. The motion of this drum is conveyed to the sprocket wheel 61$^a$ at the opposite end of the measuring frame through the sprocket wheel 61 and chain 62. The sole purpose of the chain 62 is to set in motion the mechanism of the cutting frame once every revolution of the measuring drum 60. Loosely revolving on the shaft 66 is a sprocket wheel upon which is a roller 67 which is arranged to engage the cam surface 45 of the lug 44 on the bar 43, before described, once during each revolution of the sprocket wheel 61ª or of the measuring drum 60. Rigidly secured to said sprocket wheel is an arm 68, having a sleeve 69 at its outer end, which is arranged to engage the under side of a weight roller 70 which is journaled in a bail or stirrup 71 pivoted to the frame at 72, and which normally rests in a depression 73 in the end of a bar 74, which is rigidly connected to the reciprocating cutter frame 8.

75 is a bevel gear wheel, rigidly secured to the shaft 25 and driving a bevel gear wheel 76 on a transverse shaft 77. This shaft 77 may be utilized to drive any suitable conveying mechanism, (not shown) upon which the bricks may be delivered by the conveyer belt 58.

78 designate a series of rollers at the feed-in end of the machine, over which the clay passes. These rollers turn in a pan or vessel 79 which contains oil or other lubricant.

The operation of the machine is as follows:—The column of clay issues from the die 80 of the brick machine or mixer, and passes over the series of lubricated feed-in rollers 78 onto the table or support formed by a series of brackets 12. During this operation, the cutter frame is prevented from moving longitudinally by means of the locking engagement of the weight roller 70 with the depressed end of the bar 74. When, however, the inner sprocket wheel 61ª, which acts as a timing wheel, has revolved to bring the shoe 69 into lifting engagement with the roller 70, this roller is thereby raised out of locking engagement with the bar 74. This operation is timed to occur just at the time there is a full length column of clay upon the brackets 12 ready to be cut and once during every revolution of the measuring drum 60. As soon as the bar 74 is released the pressure of the column of clay moves the entire cutting frame composed of the two ring plates 7 and the cutting elements, to the right (looking at Fig. 2). At the same time the roller 67 engages the cam lug 44 and actuates the connections in the manner before described, to cause the rotation of the gear wheel 34 on the shaft 25, and thereby the rotation of the annular gears 5. This rotation of the gears 5 is imparted to the cutter frame through the guide rods or mandrels 6, so that the cutter frame is rotated at the same time that it is moved longitudinally forward. This rotary movement of the cutter frame causes one series of the cutting wires to cut through the column of clay and sever it into brick lengths. This cutting is completed at the time the cutter frame has reached the limit of its forward movement. The gear wheel 34 is now thrown out of action by the means before described. The forward movement of the cutter frame through the pitman 30 has caused the rotation of the shaft 28 to bring the half gear wheel 27 into position to be engaged by the bevel pinion 26 on the shaft 25, and the continued rotation of the shaft 25 turns the gear wheel 27 and thereby the crank disk 29 to actuate the pitman to return the cutter frame to its original position. The gear wheel is arranged to turn the crank pin to a point just below its center, where it stands until the beginning of the next operation. During this operation the column of clay has been continually advancing onto the table or support formed by the brackets 12, and as soon as this table or support is occupied by this advancing column of clay, the timing wheel 61 has been turned by the conveyer belt 58 to cause the cycle of operations to be again repeated.

The advantages of our invention are numerous, and will be appreciated by those skilled in this art. Thus, it will be seen that instead of reciprocating the entire frame of the machine, we reciprocate merely the cutting frame and its elements, the end heads or frame plates 3 remaining stationary. The brackets or supports upon which this cutting frame travels are above the column of clay, and can thus be more easily kept free from dirt, etc. By the provision of the pins or mandrels 6, which form turning or driving pins for the cutting frame, we obviate the use of a long gear and sliding pinions. A further advantage of the machine results from the fact that, as shown in Fig. 2, we are able to set the machine very closely to the die of the brick machine, thereby avoiding a long intermediate clay column which is apt to buckle and cause difficulty. It will be further noted that the timing of the operations of the machine is controlled at the delivery end by the bricks themselves, the bricks being delivered without the use of any power except that resulting from the moving column of clay behind them, and which is amply sufficient to drive the conveyer belt and to operate the clutch mechanism. The end frames serve as housings for the gearing, and form the supports for the tracks, and thereby for the reciprocating cutter frame and elements.

Bricks of any desired thickness can be cut by the provision of suitable brackets 12, different forms of brackets being capable of being used without disturbing their supporting shaft 11, or the other parts of the machine. By flattening this shaft and clamping these brackets thereto, they are very simply and firmly secured in place.

It will be obvious that many changes may be made in the machine described without departing from our invention as defined in the appended claims. Thus, the arrangement of the driving gears may be varied; the form and arrangement of the supporting brackets for the treading frame can be varied; and any suitable arrangement of clutch mechanism and controlling connections therefor may be employed.

We claim:—

1. In a brick-cutting machine, stationary end frames or heads, annular gears housed therein, a reciprocating cutter frame supported by and between said heads, and rotating connections between the gears and the cutter frame; substantially as described.

2. A brick-cutting machine having stationary heads, tracks carried by said heads, gears housed in the heads, driving pins carried by the gears, and a reciprocating cutting frame mounted upon said tracks between the heads, and having a sliding engagement with the driving pins of the gears; substantially as described.

3. In a brick-cutting machine, stationary end frames or heads, gears rotatably mounted in said heads and having driving pins connected thereto, and a reciprocating cutter frame having a sliding engagement with the driving pin; substantially as described.

4. In a brick-cutting machine, stationary end heads, rotary gears mounted therein, driving pins connected to the gears, a reciprocating cutting frame having end rings engaging the driving pins, and bearings upon which said rings are arranged to rotate; substantially as described.

5. In a brick-cutting machine, stationary end heads, gears in said heads, means for actuating the gears, driving pins carried by the gears, a reciprocating cutting frame having driving engagement with the pins, and tracks for said frame carried by the heads; substantially as described.

6. In a brick-cutting machine, stationary end heads, a cutting frame arranged to reciprocate between said heads, means for rotating said frame, a central fixed shaft extending through the cutting frame and movable endwise therewith, and a table carried by said shaft; substantially as described.

7. In a brick-cutting machine, stationary end heads, gears mounted therein, a cutting frame supported by and reciprocable between said heads and having a driving connection with the gears, a central non-rotary shaft extending through the cutting frame and movable longitudinally therewith, and a plurality of spaced members secured to said shaft and forming a support for the clay column; substantially as described.

8. In a brick cutting machine, a stationary head, a gear rotatably mounted therein having projecting driving members, and a cutting frame slidingly engaged with said members; substantially as described.

9. In a brick cutting machine, a reciprocable and rotating cutting frame, having a central shaft fixed with respect to rotary motion, but reciprocable with said frame, said shaft having a flattened side, and a plurality of angle members or platens clamped to the flattened side of the shaft; substantially as described.

10. In a brick-cutting machine, stationary end heads, inwardly projecting tracks supported thereby, a cutting frame mounted between said heads and supported on said tracks, means for reciprocating said frame, and means for rotating the frame during its reciprocation in one direction; substantially as described.

11. In a brick cutting machine, stationary end heads having rotatable gears, driving mechanism for said gears, a measuring drum at the delivery end of the machine and actuated by the movement of the previously cut bricks, and connections actuated by the measuring drum for controlling the operation of the driving gear; substantially as described.

12. In a brick-cutting machine, an endless carrier at the delivery end of the machine and carrying drums therefor, said carrying drums being actuated solely by the moving bricks and column of clay; substantially as described.

13. In a brick-cutting machine, a reciprocating cutting frame having cutting elements, means whereby the column of clay moves said frame in one direction, a locking device for said frame, and releasing means for the locking device controlled by the movement of the cut bricks; substantially as described.

14. In a brick-cutting machine, a reciprocating cutting frame arranged to be moved in one direction by the entering column of clay, a conveyer at the delivery end of the machine also actuated by the moving column of clay, a locking device for the cutting mechanism, and means controlled by the conveyer for releasing the locking device; substantially as described.

15. In a brick-cutting machine, stationary heads, gears rotatably mounted in said heads and having driving members projecting therefrom, ring plates slidably engaged with said driving members, relatively fixed frames within the ring-plates and carrying bearings upon which said plates are rotatably mounted, tracks upon which said frames are mounted for longitudinal traverse with the ring-plates, a central shaft supported by said frames and carrying a table, means for periodically rotating said gears, and means for controlling the reciprocation of said frames; substantially as described.

16. A brick-cutting machine having a cutting frame between the brick machine and the measuring frame; substantially as described.

17. A brick-cutting machine having a cutting frame between the brick machine and the measuring frame, with means whereby the bricks after being cut actuate or set in motion the mechanism that operates the cutting frame; substantially as described.

18. In a brick-cutting machine, stationary end heads, and a cutting frame arranged to reciprocate between said heads on tracks which are above the column of clay; substantially as described.

In testimony whereof, we have hereunto set our hands.

JOHN O. LUDLAM.
CHAS. F. BONNOT.

Witnesses:
   A. A. OLDHAM,
   V. D. NIST.